(12) United States Patent
Kniegge

(10) Patent No.: US 8,002,122 B2
(45) Date of Patent: Aug. 23, 2011

(54) APPARATUS FOR VEHICLE WHEEL MAINTENANCE

(76) Inventor: William Robert Kniegge, Waxhaw, NC (US)

( * ) Notice: Subject to any disclaimer, the term of this patent is extended or adjusted under 35 U.S.C. 154(b) by 280 days.

(21) Appl. No.: 12/464,366

(22) Filed: May 12, 2009

(65) Prior Publication Data
US 2010/0202862 A1 Aug. 12, 2010

Related U.S. Application Data

(60) Provisional application No. 61/150,998, filed on Feb. 9, 2009.

(51) Int. Cl.
*A47F 5/00* (2006.01)
(52) U.S. Cl. .......................... 211/24; 414/430
(58) Field of Classification Search .................. 211/20, 211/24; 414/430
See application file for complete search history.

(56) References Cited

U.S. PATENT DOCUMENTS

| 803,196 | A | * | 10/1905 | Sherman | 211/20 |
| 2,569,546 | A | * | 10/1951 | Treue | 19/258 |
| 3,843,000 | A | * | 10/1974 | Bennett | 414/433 |
| 4,026,546 | A | * | 5/1977 | Omori | 482/61 |
| 5,069,348 | A | * | 12/1991 | Long | 211/24 |
| 5,649,883 | A | * | 7/1997 | Mayes et al. | 482/54 |
| 6,540,470 | B2 | | 4/2003 | Smith et al. | |
| 2007/0138112 | A1 | | 6/2007 | Meyer et al. | |

* cited by examiner

*Primary Examiner* — Charles A Fox
(74) *Attorney, Agent, or Firm* — Oliff & Berridge, PLC

(57) ABSTRACT

A vehicle wheel rotation apparatus including a base defining first and second flanges, first and second rollers cooperatively supported between the flanges and defining a longitudinal axis of rotation, a stationary loading bar cooperatively supported between the first and second flanges, and a non-skid bottom surface associated with the base.

20 Claims, 2 Drawing Sheets ated to provide an overview or framework for understanding the nature and character of the invention as it is claimed.

APPARATUS FOR VEHICLE WHEEL MAINTENANCE

CROSS-REFERENCE TO RELATED APPLICATION

This application claims priority to U.S. provisional application Ser. No. 61/150,998 filed Feb. 9, 2009 and entitled "APPARATUS FOR VEHICLE WHEEL MAINTENANCE," the contents of which are incorporated herein by reference.

FIELD OF THE INVENTION

The present invention relates generally to an apparatus for facilitating vehicle wheel and drive chain maintenance, and more particularly, to an apparatus including a supportive base defining first and second upwardly extending flanges that together support a stationary loading bar as well as a pair of spaced-apart rollers for cooperatively supporting a wheel in an elevated position, allowing the wheel to be rotated while the vehicle remains stationary, wherein the stationary loading bar transfers the initial force from the loading wheel in a generally downward direction to prevent the apparatus from sliding forward during loading.

BACKGROUND OF THE INVENTION

It is common among vehicles, and in particular motorcycles, to access the wheels and components related to wheel rotation for maintenance and cleaning. With regard to cleaning a wheel in contact with the ground, portions of the wheel and wheel components are often positioned behind the frame and other parts of the vehicle, making access to the entire wheel difficult without moving the vehicle. Thus, in order to easily access the entire wheel, it is necessary to move the vehicle forward in small intervals to access different portions of the wheel. This process is disadvantageous in that it is time consuming, requires a large working area, and requires that tools and cleaning supplies be moved along with the vehicle.

With regard to servicing a wheel and wheel rotation related components, such as a vehicle drive chain, it is often necessary to place the vehicle on a stationary frame stand so that the wheel can be rotated without moving the vehicle. Conventional frame stands are disadvantageous in that they are typically large and cannot be carried with the vehicle, and it is often difficult for one person to load the vehicle onto the stand due to the weight of the vehicle and height of the stand. To overcome the disadvantages of stationary frame stands, ramped wheel stands have been developed that include a ramp for facilitating loading onto rollers that permit wheel rotation. While advantageous in that the vehicle can be rolled onto the stand as opposed to lifted, ramped stands are disadvantageous in that the loading ramp tends to transfer the initial force from the loading wheel horizontally, causing the stand to slide forward in the direction away from the loading wheel. Thus, loading onto a ramped stand requires either a partial lifting force during loading or a relatively fast loading motion to overcome the horizontal portion of the loading force and apply a great enough downward force on the stand to prevent stand movement.

Accordingly, to overcome the disadvantages of prior art frame and ramped stands, an apparatus is provided herein that prevents movement of the stand during loading and allows vehicle wheel and other components related to the rotation of the wheel to be serviced and/or cleaned while keeping the vehicle stationary. The apparatus is advantageous in that it can be readily utilized by one person, is compact and thus can be carried on the vehicle, is rugged to withstand long term use, and includes a loading step that directs the initial force from the loading wheel in a downward direction to stabilize the apparatus on its supporting surface and prevent it from sliding forward during loading.

BRIEF SUMMARY OF THE INVENTION

In one aspect, an apparatus is provided for facilitating maintenance, repair and cleaning of wheel and wheel rotation-related components.

In another aspect, an apparatus is provided for rotatably supporting and elevating a vehicle wheel such that the wheel can be rotated while keeping the vehicle stationary.

In yet another aspect, an apparatus is provided that is compact and rugged.

In yet another aspect, an apparatus is provided that can be operated by a single user.

In yet another aspect, an apparatus is provided including a non-skid bottom surface for stabilizing the base on its supporting surface, such as the ground.

In yet another aspect, an apparatus is provided including a loading bar operable for transferring the initial force from a loading wheel in a generally downward direction toward the supporting surface of the base, thus preventing the apparatus from sliding forward in the horizontal direction relative to the supporting surface during loading.

In yet another aspect, the loading bar is a stationary cylindrical bar cooperatively supported between a pair of flanges that extend upwardly from a supporting base.

In yet another aspect, an apparatus is provided including a stationary loading bar and a pair of rollers, wherein the loading bar has a diameter less than the diameter of the rollers, wherein the loading bar is positioned adjacent one of the rollers, and further wherein the longitudinal axes of the loading bar and rollers all lie in substantially the same plane.

To achieve the foregoing and other aspects and advantages of the present invention, an apparatus for allowing a vehicle wheel to rotate while keeping the vehicle stationary is provided including a stationary loading bar, also referred to herein as a "step," for loading a vehicle wheel onto first and second rollers that cooperatively support the vehicle wheel in an elevated position in which the wheel can be rotated. The apparatus includes a base, also referred to herein as a "housing," for rotatably supporting the first and second spaced apart rollers as well as the stationary loading bar positioned adjacent one of the rollers. Based on its lesser diameter relative to that of the rollers, the stationary loading bar provides a step intermediate the height between the base and the uppermost surface of the adjacent roller, thus aiding in loading a wheel onto the adjacent roller by providing a first contact structure lower than the adjacent roller, but elevated from the base. The apparatus further preferably includes a non-skid bottom surface or non-skid material adhered to the bottom surface of the base for providing traction with the supporting surface, thus aiding in preventing the apparatus from sliding horizontally away from the loading wheel or during use. The first and second rollers preferably include bearings to facilitate axial rotation, while the loading bar is stationary.

Additional features and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
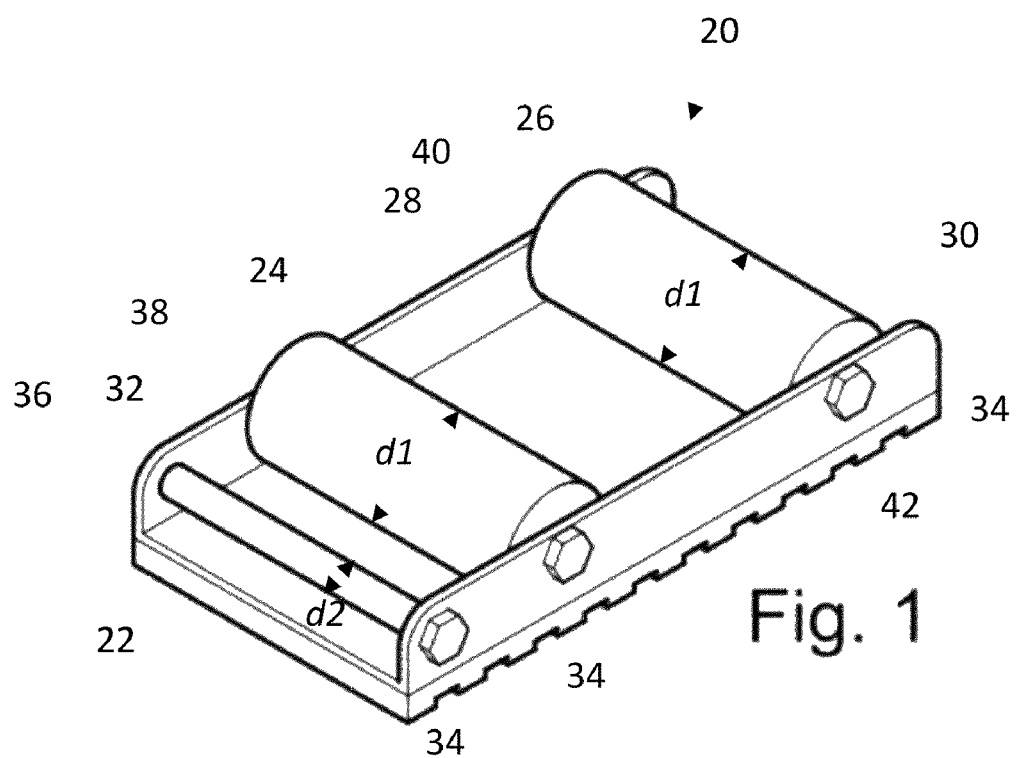
FIG. 1 is a perspective view of a wheel rotation apparatus including a fixed loading bar and first and second rollers supported by a base in accordance with a preferred embodiment of the present invention.

Referring to FIG. 1, a wheel rotation apparatus is shown generally at reference numeral 20. The apparatus 20 includes a generally planar, rectangular base 22 defining first and second upwardly extending flanges 28 and 30. The first and second flanges 28 and 30 are generally perpendicular relative to the horizontal base 22. The first and second flanges 28 and 30 are rounded about their opposing corners for preventing tire puncture upon tire contact with the apparatus. The first and second flanges 28 and 30 extend upwardly a predetermined height from the base 22 that corresponds to the diameter of the rollers and the desired height of the rollers from the upper surface of the base. Thus, the apparatus may be scaled to accommodate rollers of any diameter and length.

First and second rollers 24 and 26 are cooperatively supported between the first and second flanges 28 and 30. The first and second rollers 24 and 26 may be secured to the flanges 28 and 30 using any conventional fastener. As shown, a bolt 34 that functions as a roller axle is received through openings defined through the first and second flanges 28 and 30. The axles may be secured in place via an enlarged head and a nut at opposing ends. Axial rotation of the first and second rollers 24 and 26 is achieved using bearings, such as roller bearings known to those skilled in the art, for providing reduced friction rotation. The first and second rollers 24 and 26 are preferably spaced apart to cooperatively support a wheel in a position elevated from the top surface of the base 22. The distance between the first and second rollers 24 and 26 corresponds to the diameter of the wheel to be supported. Thus, a larger diameter wheel may require the first and second rollers 24 and 26 to be positioned further apart.

In an exemplary embodiment, the first and second rollers 24 and 26 are about 1" in diameter and several inches in length, thus providing a compact, portable apparatus able to accommodate a motorcycle wheel. The rollers 24 and 26 are spaced apart from about more than 1 to several inches to support and maintain the vehicle wheel therebetween without the wheel coming off of the rollers during use. The rollers 24 and 26 are preferably elevated from the base plate a sufficient distance to provide a clearance between the rollers and the base plate when the wheel is loaded, thus allowing the rollers to be rotated without interference from the base 22.

The apparatus 20 further includes a stationary loading bar 32 positioned adjacent one of the rollers 24 and 26, such as the first roller 24 as shown. As shown, the loading bar 32 is cylinder-shaped. The loading bar 32 may be positioned adjacent either roller, but may not be positioned between the rollers 24 and 26. Like the rollers 24 and 26, the loading bar 32 is cooperatively supported between the first and second flanges 28 and 30. The loading bar 32 may be secured with a bolt 34 like the rollers. Alternatively, the loading bar 32 may consist of a bolt threaded or otherwise secured through openings defined in the first and second flanges 28 and 30.

The loading bar 32 preferably has a diameter d2 less than the diameter d1 of the first and second rollers 24 and 26. The loading bar 32, first roller 24 and second roller 26 define longitudinal axes 36, 38 and 40, respectively, all aligned in substantially the same plane and parallel to one another. The longitudinal axes 36, 38 and 40 are the rotational axes of the components. By aligning the longitudinal axes in substantially the same plane, and by providing the loading bar 32 with a lesser diameter, the loading bar 32 functions as a stationary "step" positioned intermediate the height defined between the upper surface of the base 22 and the peak of the rollers 24 and 26. By providing a stationary step in this position, the loading bar 32 transfers the initial force from a loading wheel in a generally downward direction toward the supporting surface of the base 22, such as the ground, thus preventing the apparatus from sliding forward in the horizontal direction relative to the supporting surface and away from the wheel during loading. In contrast, conventional ramped structures transfer the initial loading force in a generally horizontal direction, causing the apparatus to slide forward.

The apparatus 20 further includes a non-skid bottom surface 42 for providing traction between the ground surface and the apparatus. The non-skid bottom surface 42 may be integrally formed with the base 22 or may be subsequently applied. Suitable examples of non-skid materials include, but are not limited to, non-skid tapes, traction paints and patterned materials such as metal, rubber and nylon. The non-skid bottom surface 42 is preferably rugged, durable and prevents movement of the apparatus during loading, unloading and during use.

As stated above, the apparatus 20 may have any scale, and is preferably scaled to accommodate the wheel to be supported. In the case of a motorcycle wheel, for example, the apparatus may be several inches in length, width and height, for example, about 4"×3"×1". The height of the apparatus 20 is preferably just enough to support the wheel in a position elevated from the ground surface without too high of a step to make loading difficult. The apparatus 20 may be constructed from any material, and is preferably constructed from durable materials such as metals. The roller axles, loading bar and flanges are preferably constructed from materials resistant to bending under the weight of the vehicle.

Figure 2:
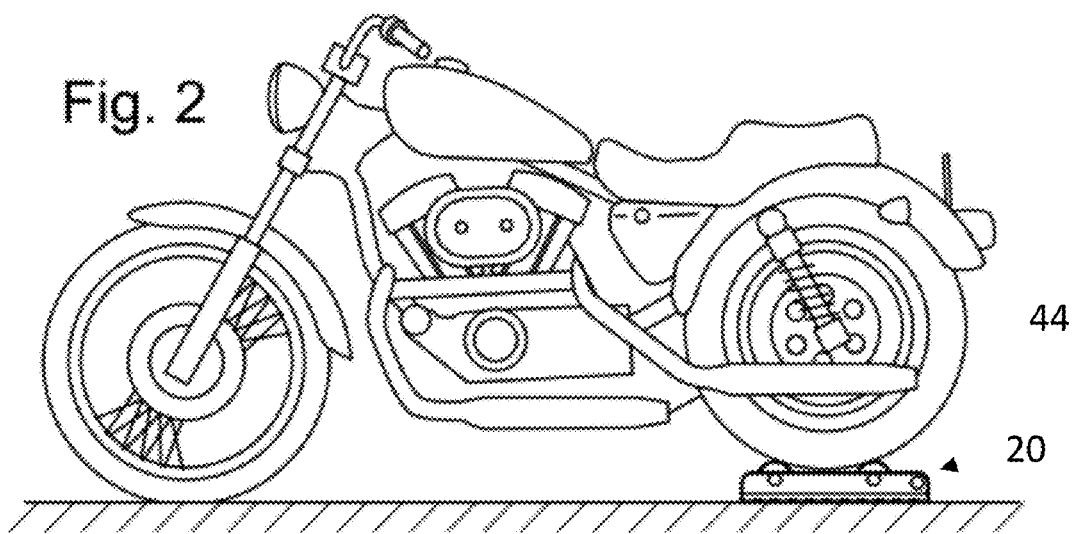
FIG. 2 is an illustration of a vehicle wheel loaded onto the apparatus of FIG. 1.
Figure 3:
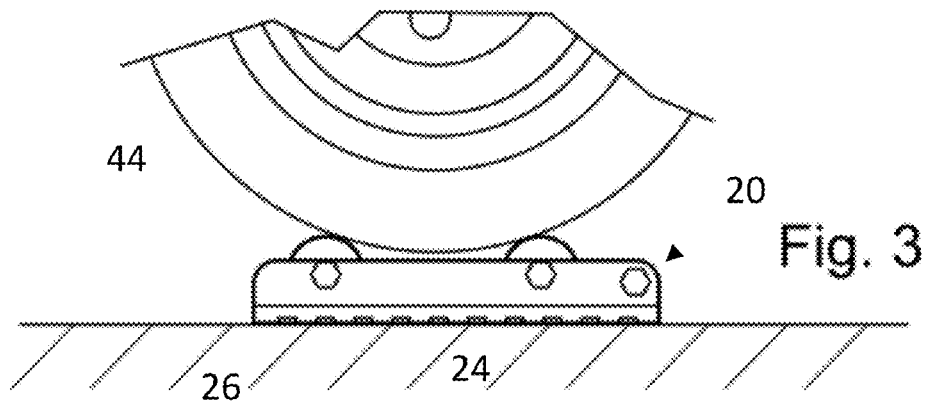
FIG. 3 is a detailed view of the point of contact of the vehicle wheel and the first and second rollers.

Referring to FIGS. 2-3, the wheel rotation apparatus 20 is shown in use for rotating a motorcycle wheel 44. Loading begins by first placing the apparatus 20 on relatively level ground. The vehicle wheel 44 is rolled onto the apparatus by first engaging the loading bar, followed by the first 24 and then the second roller 26. Loading is complete when the wheel 44 is cooperatively supported by the first and second rollers 24 and 26 in a position elevated from the ground surface. The vehicle may be either pushed or driven onto the apparatus. The side stand (i.e., kickstand) is preferably placed in the down position to prevent the vehicle from falling. The wheel 44 is able to be rotated, such as by hand, when the vehicle is in the fully upright position or when supported by the side stand. Thus, the wheel 44 is able to be rotated even when the bike is in a leaning position. To service the wheel 44 or other component related to wheel rotation, the wheel 44 is rotated to a desirable accessible position. To clean the wheel 44, the wheel is rotated in intervals until all portions have been exposed. To unload the vehicle, the wheel 44 is either rolled backward in the opposite direction in which it was loaded, or rolled forward off of the second roller 26.

In an alternative embodiment, the apparatus 20 may optionally include a second loading bar positioned proximate the second roller 26 for loading/unloading in either direction.

While a vehicle wheel rotation apparatus has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A vehicle wheel rotation apparatus, comprising:
   a base defining first and second flanges that extend generally perpendicularly from the base;
   first and second rollers cooperatively supported between the first and second flanges, each of the first and second rollers defining a longitudinal axis of rotation;
   a stationary loading bar cooperatively supported between the first and second flanges and positioned adjacent the first roller and apart from the second roller, the stationary loading bar defining a longitudinal axis; and
   a non-skid bottom surface associated with the base for providing traction between the base and a supporting surface.

2. The apparatus according to claim 1, wherein the loading bar has a diameter less than the diameter of the first and second rollers.

3. The apparatus according to claim 1, wherein the longitudinal axes defined by the loading bar and the first and second rollers are substantially in the same plane.

4. The apparatus according to claim 1, wherein the longitudinal axes defined by the loading bar and the first and second rollers are substantially parallel.

5. The apparatus according to claim 1, wherein the first and second rollers include a bearing for reduced friction rotation.

6. The apparatus according to claim 1, wherein corners defined by the first and second flanges are rounded to prevent tire puncture.

7. The apparatus according to claim 1, wherein the non-skid bottom surface is adhered to the base.

8. The apparatus according to claim 1, wherein the non-skid bottom surface is integral with the base.

9. The apparatus according to claim 1, wherein the non-skid bottom surface is one of non-skid tape, traction paint and patterned material such as metal, rubber and nylon.

10. The apparatus according to claim 1, wherein the loading bar is positioned at a height intermediate the base and a peak of the first and second rollers.

11. The apparatus according to claim 1, wherein the first and second rollers and the loading bar are supported between the flanges by a bolt and nut received through openings defined in the first and second flanges.

12. A vehicle wheel rotation apparatus, comprising:
    a base defining first and second flanges that extend generally perpendicularly from the base;
    first and second rollers cooperatively supported between the first and second flanges, each of the first and second rollers defining a longitudinal axis of rotation;
    a stationary loading bar cooperatively supported between the first and second flanges and positioned adjacent the first roller and apart from the second roller, the stationary loading bar defining a longitudinal axis; and
    a non-skid bottom surface associated with the base for providing traction between the base and a supporting surface,
    wherein the loading bar is positioned at a height intermediate the base and a peak of the first and second rollers.

13. The apparatus according to claim 12, wherein the loading bar has a diameter less than the diameter of the first and second rollers.

14. The apparatus according to claim 12, wherein the longitudinal axes defined by the loading bar and the first and second rollers are substantially in the same plane.

15. The apparatus according to claim 12, wherein the longitudinal axes defined by the loading bar and the first and second rollers are substantially parallel.

16. The apparatus according to claim 12, wherein the first and second rollers include a bearing for reduced friction rotation.

17. The apparatus according to claim 12, wherein corners defined by the first and second flanges are rounded to prevent tire puncture.

18. The apparatus according to claim 12, wherein the non-skid bottom surface is adhered to the base.

19. The apparatus according to claim 12, wherein the non-skid bottom surface is integral with the base.

20. The apparatus according to claim 12, wherein the non-skid bottom surface is one of non-skid tape, traction paint and patterned material such as metal, rubber and nylon.

* * * * *